United States Patent
Fisher

(10) Patent No.: US 7,896,614 B2
(45) Date of Patent: Mar. 1, 2011

(54) WIND TURBINE BLADE WITH INTEGRATED STALL SENSOR AND ASSOCIATED METHOD OF DETECTING STALL OF A WIND TURBINE BLADE

(75) Inventor: Murray Fisher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 12/433,007

(22) Filed: Apr. 30, 2009

(65) Prior Publication Data

US 2010/0143129 A1   Jun. 10, 2010

(51) Int. Cl.
*F03D 11/00*  (2006.01)
(52) U.S. Cl. .............................. 416/61; 416/1; 416/23; 416/228
(58) Field of Classification Search .................... 416/61, 416/146 R, 1, 23, 228
See application file for complete search history.

(56) References Cited

U.S. PATENT DOCUMENTS

| | | | | |
|---|---|---|---|---|
| 2,373,089 A | * | 4/1945 | Allen et al. ................. | 340/966 |
| 2,431,241 A | * | 11/1947 | Godsey, Jr. ................. | 340/966 |
| 2,486,779 A | * | 11/1949 | Fairbanks .................... | 340/966 |
| 2,603,695 A | * | 7/1952 | Campbell .................... | 340/966 |
| 4,427,897 A | | 1/1984 | Migliori | |
| 6,065,334 A | | 5/2000 | Corten | |
| 6,941,816 B2 | * | 9/2005 | Kurtz et al. .................... | 73/756 |
| 7,172,392 B2 | * | 2/2007 | Wastling et al. ............... | 416/43 |

* cited by examiner

*Primary Examiner*—Ninh H Nguyen
(74) *Attorney, Agent, or Firm*—Dorthy & Manning, P.A.

(57) ABSTRACT

A wind turbine includes an electrical stall sensor configured on a pressure surface of at least one turbine blade at a location to detect backflow in a stall condition. The stall sensor includes a flap pivotally configured on the respective pressure surface so as to be moved from a first position towards a second position by backflow over the pressure surface during a stall condition. A sensor circuit responds to movement of the flap between the first and second positions and generates a corresponding electrical signal that indicates the stall condition.

18 Claims, 5 Drawing Sheets

WIND TURBINE BLADE WITH INTEGRATED STALL SENSOR AND ASSOCIATED METHOD OF DETECTING STALL OF A WIND TURBINE BLADE

FIELD OF THE INVENTION

The present invention relates generally to wind turbines, and more particularly to a wind turbine blade having a stall sensor configured therewith.

BACKGROUND

Wind power is considered one of the most environmentally friendly energy sources presently available, and wind turbines have gained increased attention in this regard. A modern wind turbine typically includes a tower, generator, gearbox, nacelle, and one more turbine blades. The blades capture kinetic energy of wind using known foil principles. The blades transmit the kinetic energy in the form of rotational energy so as to turn a shaft coupling the blades to a gearbox or directly to the generator. The generator then converts the mechanical energy to electrical energy that may be deployed to a utility grid.

The turbine blade profile is an important design characteristic. The blades are designed so that laminar flow over the blades imparts a maximum rotational torque to the rotor over a range of wind speeds, for example between about 15 and 35 MPH. For various considerations, including protection of the turbine components and downstream generator, it is generally not desired to operate the turbines above their rated wind speed.

"Stall" is a condition wherein the angle of attack of the incident wind relative to the turbine blade profile increases with increased wind speed to the point wherein laminar flow over the low-pressure (back) side of the blade is disrupted and backflow is induced. Although more common at the low pressure side of the blade, stall can also occur at the high pressure (front) side of the blade. In a stall condition, the motive force on the blade is significantly reduced. Other factors can also contribute to stall, such as blade pitch, blade fouling, and so forth. Stall is a design consideration and stall regulation is an effective design feature to protect wind turbines in high wind conditions, particularly turbines with fixed-pitch blades. On stall-regulated turbines, the blades are locked in place and cannot change pitch with changing wind speeds. Instead, the blades are designed to gradually stall as the angle of attack along the length of the blade increases with increasing wind. Accordingly, it is important to know the flow characteristics of a turbine blade profile, particularly with respect to the onset of stall.

Efforts have been made in the art to detect the onset of turbine blade stall. For example, U.S. Pat. No. 6,065,334 proposes to mount a series of pivotal flaps on the monitored surface of a turbine blade, with one side of the flaps having a visually distinct appearance (i.e., different color or reflective characteristic) as compared to the opposite side of the flaps. Backflow over the blade surface causes the flaps to flip over and thus present a visually distinct and detectable change. However, inherent limitations exist with this type of visual detection system. For example, the system is dependent on the ability to accurately detect the changed visual characteristic of the flaps from ground level, which may be difficult in low or no light conditions, or in adverse weather conditions. At night when winds are typically greater, the system requires an illumination device aimed at the blades, as well as a camera or other optical detection device, in order to detect the changed state of the flaps. For larger turbines, the size of the blades may make it extremely difficult to optically detect the flaps from ground level even under ideal light and weather conditions without a magnified optical detector. Also, the ability to obtain an accurate qualitative measurement is dependent on the ability to distinguish between the different flaps attached along the blade surface.

Accordingly, there is a need for an improved stall sensor for wind turbine rotor blades that generates an accurate and reliable indication of blade stall without the inherent drawbacks of known devices.

BRIEF DESCRIPTION OF THE INVENTION

The present invention provides an improved stall sensor for wind turbine blades, and associated method of detecting stall. The sensor generates a reliable and accurate electrical signal that is not dependent upon detection of an optical characteristic of a device attached to the turbine blade. An accurate qualitative measurement can be deduced from the signal. Additional aspects and advantages of the invention may be set forth in part in the following description, or may be obvious from the description, or may be learned through practice of the invention.

In accordance with aspects of the invention, a wind turbine includes at least one turbine blade connected to a rotor hub. An electrical stall sensor is configured on a surface of the blade at a location to detect backflow in a stall condition. The sensor may be attached to the low pressure or high pressure side of the blade. For multiple bladed turbines, one or more sensors may be configured on each turbine blade, or only one of the blades. The stall sensor includes a power supply, for example an internal battery or, in an alternate embodiment, the stall sensor may be supplied power from an external source, such as a low voltage from the wind turbine controller. The stall sensor includes a flap pivotally configured on one of the low pressure or high pressure surfaces of the turbine blade. The flap is caused to pivot from a first position towards a second position by backflow over the respective pressure surface that is generated in a stall condition. The sensor may include any manner of sensor circuit that responds to movement of the flap between the first and second positions and generates a corresponding electrical signal that indicates the stall condition.

The present invention also encompasses a method for detecting stall of a wind turbine blade by mounting an electronic stall sensor on at least one turbine blade at a location so as to be exposed to backflow in a stall condition of the blade, the stall sensor being configured to produce an electrical signal upon being exposed to backflow in a stall condition. The method includes transmitting the electrical signal from the stall sensor to a remote receiver, and monitoring the remote receiver for indications of stall.

BRIEF DESCRIPTION OF THE DRAWINGS

The invention, in accordance with preferred and exemplary embodiments, together with further aspects and advantages thereof, is more particularly described in the following detailed description taken in conjunction with the accompanying drawings in which.

DETAILED DESCRIPTION

Figure 1:
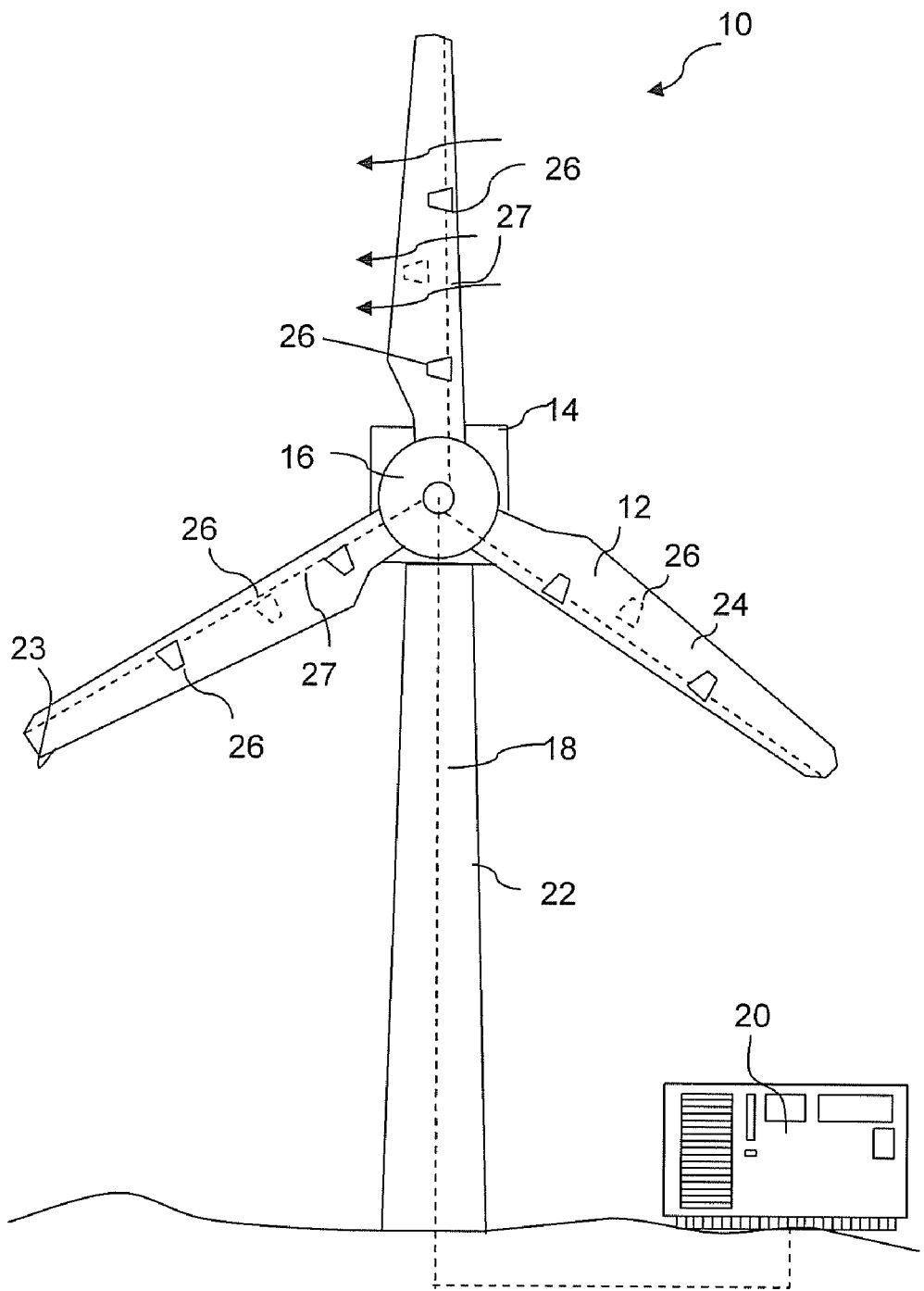
FIG. 1 is a view of a wind turbine with a stall sensor configured on each turbine blade.

Reference is now made to particular embodiments of the invention, one or more examples of which are illustrated in the drawings. Each embodiment is presented by way of explanation of aspects of the invention, and should not be taken as a limitation of the invention. For example, features illustrated or described with respect to one embodiment may be used with another embodiment to yield still further embodiment. It is intended that the present invention include these and other modifications or variations made to the embodiments described herein.

FIG. 1 illustrates a wind turbine 10 of conventional construction. The wind turbine 10 includes a tower 22 with a nacelle 14 mounted thereon. A plurality of turbine blades 12 are mounted to a rotor 16. The blades 12 convert motive force of wind into rotational mechanical energy to generate electricity with a generator housed in the nacelle 14. The individual wind turbine 10 may include a controller housed in the nacelle 14, and may be in communication with a central ground based controller 20 via transmission lines 18 that run through the tower 22. The ground based controller 20 is typically configured with a number of turbines within, for example, a wind farm.

At least one of the turbine blades 12 includes a stall sensor 26 configured on either of the low pressure surface 24 or high pressure surface 23 (dashed line sensors 26). In the embodiment of FIG. 1, each of the turbine blades 12 includes at least one stall sensor 26 configured on each of the low pressure surface 24 and high pressure surface 23. It should be appreciated that the present invention encompasses any combination of stall sensors 26 configured on any combination of the various turbine blade surfaces. For example, only one blade 12 of a multiple-bladed turbine may have a stall sensor 12, or each blade 12 may have one or sensors 26 on one or both of the pressure surfaces 24, 23. The stall sensors 26 may be in communication with the nacelle controller via transmission lines 27 to provide an electronic signal indication of a stall condition at the respective turbine blade 12. This signal may be used by the nacelle controller for any manner of control functions. For example, in an active pitch control system, the nacelle controller may use the signal as a variable for controlling the pitch of the individual turbine blades 12 to eliminate the stall condition, reduce power of the turbine, or any other control function. The signal from the stall sensors 26 may be used simply to generate an alarm or other indication of a stall condition at the turbine blades 12. The invention is not limited by any particular use of the signals generated by the stall sensors 26.

Figure 2:
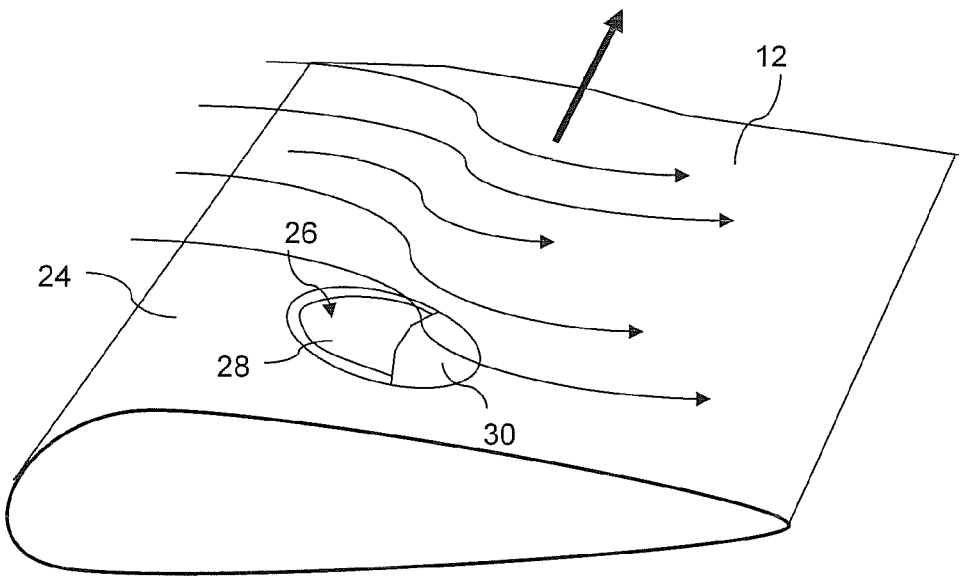
FIG. 2 is an enlarged view of a portion of a turbine blade having a stall sensor mounted thereon.
Figure 3:
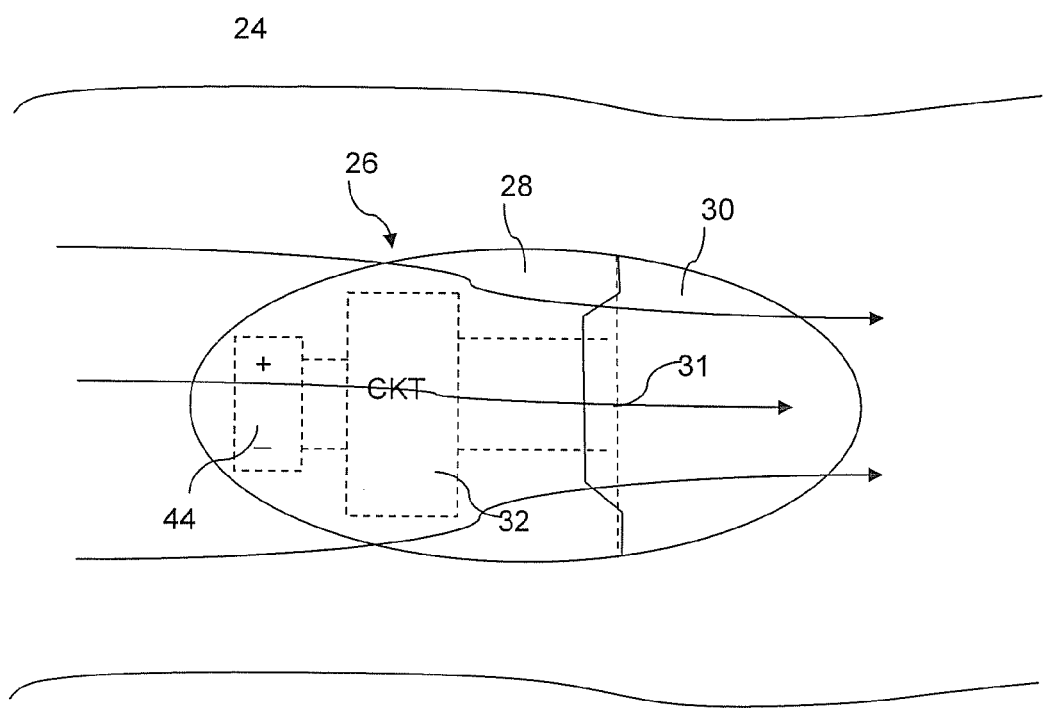
FIG. 3 is a top view of the embodiment illustrated in FIG. 3.

FIGS. 2 and 3 illustrate an embodiment of a stall sensor 26 mounted or otherwise attached onto the low pressure surface 24 of a wind turbine blade 12. The stall sensor 26 includes a stationary base 28 and a flap member 30 that pivots relative to the base 28 at a pivot axis 31. The flap 31 pivots between a first position wherein laminar flow is generated over the low pressure surface 24, as indicated by the arrows in FIGS. 2 and 3 to a second position wherein the laminar flow is disrupted and backflow is induced at the low pressure surface 24, as indicated by the arrows in FIG. 5.

Any manner of components may be contained within the base 28, such as control circuitry 32, a dedicated power supply 44, and the like. The control circuitry 32 is particularly configured to respond to movement of the flap 30 from the first position illustrated in FIG. 4 to the second position illustrated in FIG. 5, and to generate a corresponding electrical signal that indicates the stall condition depicted in FIG. 5.

Figure 4:
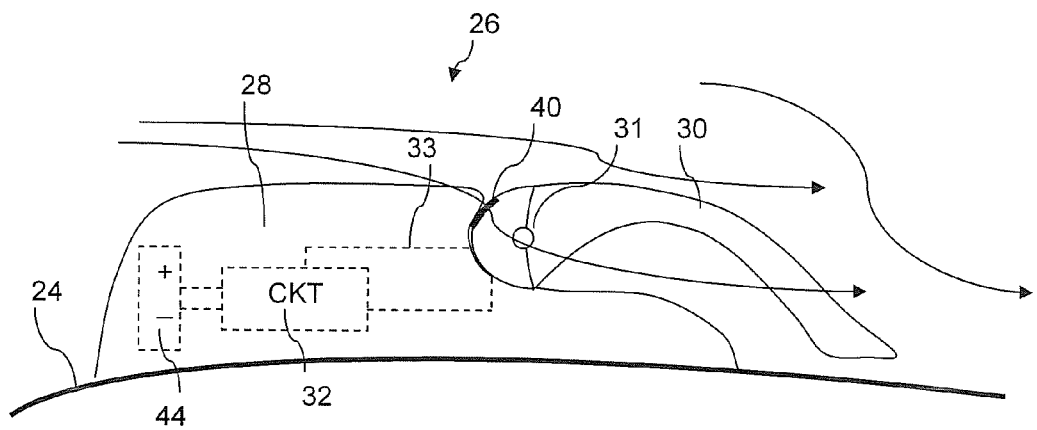
FIG. 4 is a side view of an embodiment of a stall sensor mounted on a low pressure surface of a turbine blade.
Figure 5:
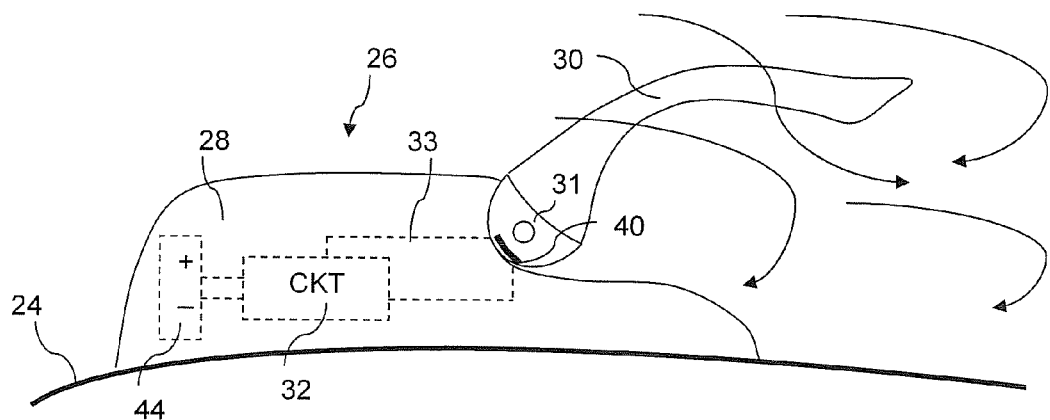
FIG. 5 is a side view of the embodiment of FIG. 4 with the stall sensor indicating a stall condition.
Figure 6:
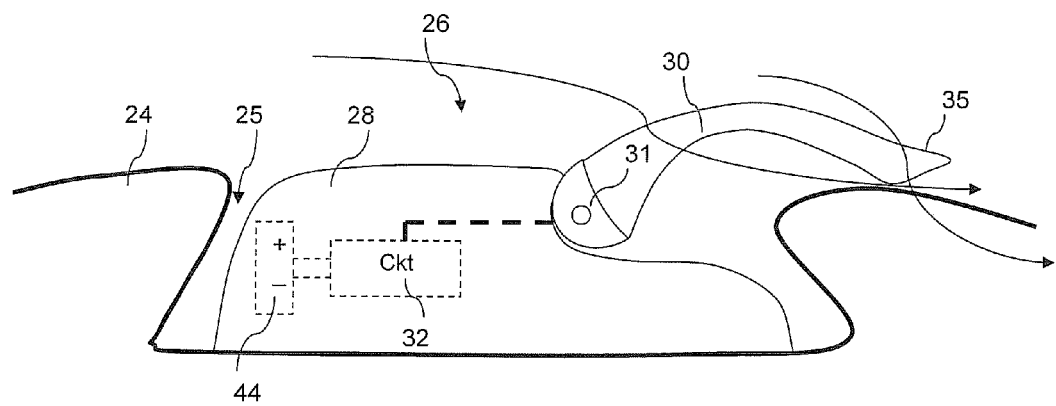
FIG. 6 is a side view of an alternate embodiment of a stall sensor mounted on a low pressure surface of a turbine blade.

Base member 28 may be mounted onto the surface of the turbine blade 12 by adhesive or other appropriate means, as indicated in FIGS. 4 and 5. In an alternative embodiment that minimizes the profile of the stall sensor relative to the low pressure surface 24 of the turbine blade 12, the sensor 26 may be recessed within a recess 25 in the turbine blade low pressure surface 24, as depicted in FIG. 6. With this particular embodiment, the first position of the flap 30 is elevated as compared to the embodiment of FIGS. 4 and 5 so as to lie essentially flush or slightly above the low pressure surface 24. The flap 30 may include a raised lip 35 to ensure that the flap 30 reacts to backflow conditions over the low pressure surface 24.

The stall sensor 26, and more particularly the sensor circuit 32, may incorporate any manner of known technique for converting movement of the flap 30 into an electrical signal. For example, in the embodiment illustrated in FIGS. 4 and 5, the sensor circuit 32 includes an open circuit 33. The flap 30 includes a contact 40 located on a surface that slides against the base 28 upon movement of the flap 30 from the first position to the second position. In the second position of the flap 30 as indicated in FIG. 5, the contact 40 closes the circuit 33. With the closed circuit 33, any characteristic of the circuit may be sensed by the sensor circuit 32, such as a voltage, resistance, current, and so forth. The type of circuit illustrated in FIGS. 4 and 5 is conventionally known as a make-or-break contact circuit wherein an "on" or "off" state is indicated without a quantitative value. In other words, the arrangement of the sensor 26 illustrated in FIGS. 4 and 5, the sensor circuit 32 will generate a signal that simply indicates whether or not a stall condition is present. The circuit 32 does not generate a quantitative measurement of the relative degree of movement of the flap 30 relative to the base 28.

In alternate embodiments, the stall sensor 26 may be configured to generate a quantitative indication of the relative degree of movement of the flap 30. For example, the circuit 32 may measure a change in a circuit characteristic, such as voltage or resistance, which varies with relative movement of the flap 30. Referring to FIG. 6, any manner of conventional transducer known or used in the art to measure the relative degree of movement of one member relative to another may be utilized in this regard. For example, the circuit 32 may include any manner of rheostat, potentiometer, pressure transducer, strain gauge, or any other suitable device to measure relative motion of the flap 30 relative to the base 28. For example, in one particular embodiment, the flap 30 may be biased towards the first position by way of a spring or other biasing member, and a load cell may be utilized to measure resistance of the flap 30 to backflow conditions, with the magnitude of resistance giving a quantitative indication of the stall condition at the low pressure surface 24 of the turbine blade 12. It should thus be readily appreciated that the transducer circuit 32 illustrated in FIG. 6 is intended to encompass any manner of electrical electrical-mechanical, or mechanical device that generates a signal in response to movement of the flap 30 relative to the base 28. The stall sensor 26 transmits the generated signal as an electrical signal.

In the illustrated embodiments, the sensor 26 includes a dedicated power supply 44, such as an internal battery. The batteries 44 may be recharged from the nacelle controller, or periodically replaced. In an alternative embodiment, the sensor circuit 32 may be supplied power from the nacelle controller via the transmission lines 27 (FIG. 1).

Figure 7:
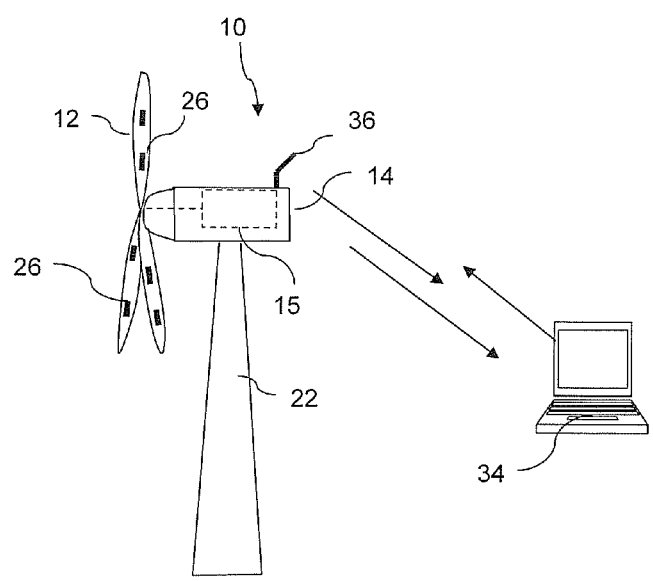
FIG. 7 is a view of a wind turbine and stall sensor system.

The signal from the stall sensor 26 indicative of a stall condition may be transmitted and processed in various ways depending on the control configuration of the individual wind turbine 10. For example, referring to FIG. 7, a remote receiver 34, which may be any manner of control hardware, may be in wireless communication with the wind turbine 10 via a transmitter/receiver 36 configured with the nacelle controller 15. The individual stall sensors 26 may be in wired or wireless communication with the nacelle controller 15 and, via this configuration, the signals from the stalls sensors 26 may be communicated to the remote receiver 34 as an alarm condition, or as an input to any manner of control function, such as pitch control of the turbine blades 12, and so forth.

Figure 8:
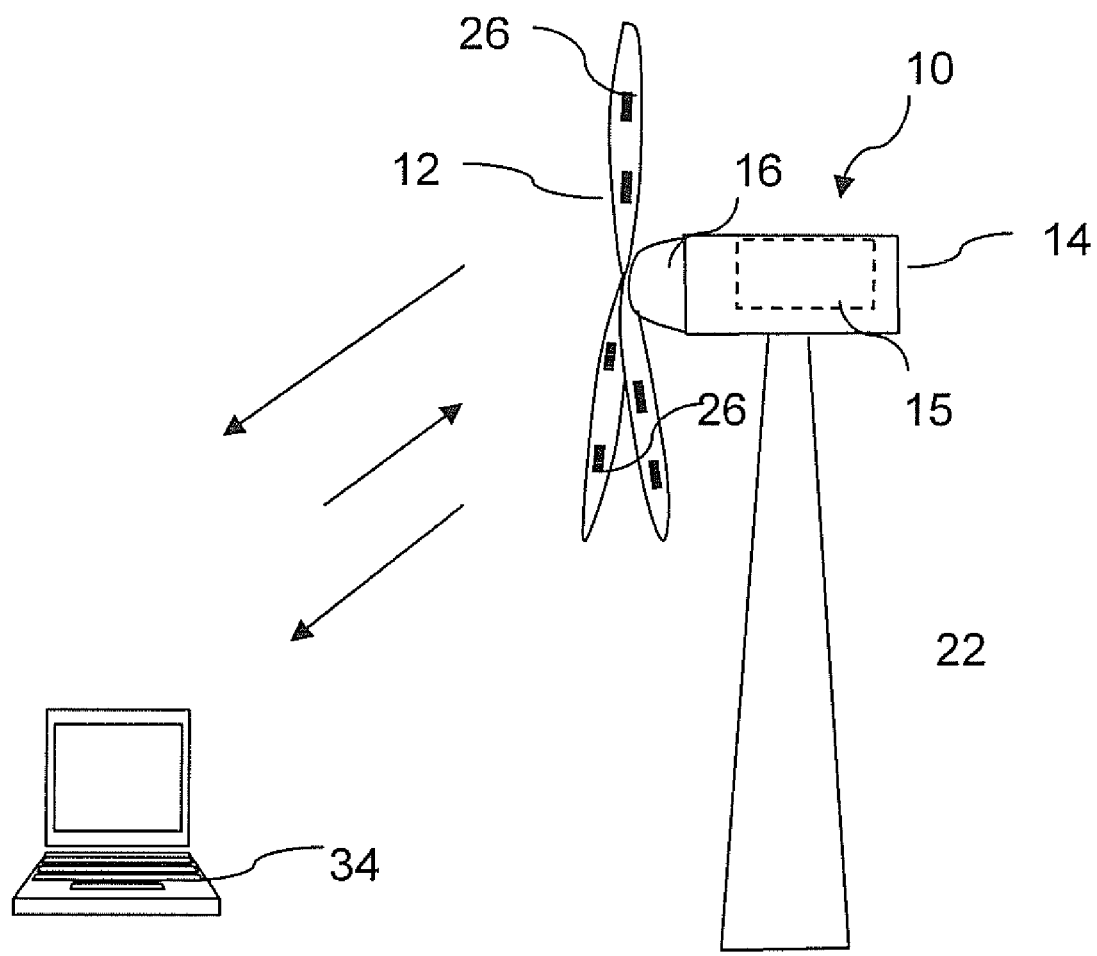
FIG. 8 is a view of an alternative embodiment of a wind turbine and stall sensor system.

In an alternative embodiment illustrated in FIG. 8, the individual stall sensors 26 may be configured to wirelessly transmit directly to the remote receiver 34. With this particular embodiment, each of the stall sensors 26 is configured with a transmitter for this purpose. This embodiment would require a more robust power supply for the individual stall sensors 26. It should be readily appreciated that any manner of transmission system may be utilized for transmitting the control signals from the individual stall sensors 26 to any manner of controller for indication of a stall condition and/or control function.

The signals and information generated by the stall sensors 26 may further aid in the understanding of reversed flow on a turbine blade 12, and to incorporate this knowledge into different turbine blade designs to avoid adverse flow phenomena at the turbine blades. The stall sensors 26 may be used to monitor blade fouling that is believed to be a cause of stall/reserved flow, and that leads to a significant degradation of the wind turbine performance. For example, the stall sensors may be used to evaluate the correlation between stall and blade fouling, and provide a means for field service teams to quantify and analyze the impact of blade fouling in terms of lost energy, repairs, warranty claims, and the like. Also, as mentioned, the stall sensors may also be incorporated into the turbine controller to detect stall and drive the turbine out of the stall condition.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine, comprising:
    a turbine blade connected to a rotor hub, said turbine blade comprising a low pressure surface and a high pressure surface;
    an electrical stall sensor configured on at least one of said low pressure surface or said high pressure surface at a location to detect backflow in a stall condition at said respective pressure surface, said stall sensor further comprising:
        a power supply;
        a flap pivotally configured relative to said respective pressure surface so as to be moved from a first position towards a second position by backflow over said respective pressure surface;
        a sensor circuit that responds to movement of said flap between said first and second positions and generates a corresponding electrical signal that indicates a stall condition; and
    a controller, said stall sensor in communication with said controller to provide an input variable to said controller indicative of a stall condition, said controller configured to change an operating function of said wind turbine in response to the stall condition.

2. The wind turbine as in claim 1, wherein said stall sensor comprises a base member, said flap pivotally mounted to said base member, said power supply and said sensor circuit housed in said base member.

3. The wind turbine as in claim 1, further comprising a receiver in wired communication with said stall sensor to receive said electrical signal.

4. The wind turbine as in claim 1, wherein said stall sensor further comprises a transmitter, and further comprising a remote receiver in wireless communication with said stall sensor.

5. The wind turbine as in claim 1, wherein said sensor comprises an open circuit, and a contact configured on said flap, wherein sliding electrical contact between said contact and said open circuit upon movement of said flap from said first position towards said second position produces said electrical signal.

6. The wind turbine as in claim 1, wherein said stall sensor comprises a base member recessed in said respective pressure surface.

7. The wind turbine as in claim 1, wherein said stall sensor is configured on said low pressure surface of said turbine blade.

8. The wind turbine as in claim 1, comprising a plurality of said turbine blades with at least one said stall sensor configured on a respective said pressure surface of each of said turbine blades.

9. The wind turbine as in claim 1, wherein each of said plurality of turbine blades comprises at least one said stall sensor configured on each of said low pressure surface and said high pressure surface.

10. A wind turbine, comprising:
    a turbine blade connected to a rotor hub, said turbine blade comprising a low pressure surface and a high pressure surface;
    an electrical stall sensor configured on at least one of said low pressure surface or said high pressure surface at a location to detect backflow in a stall condition at said respective pressure surface, said stall sensor further comprising:
        a power supply;
        a flap pivotally configured relative to said respective pressure surface so as to be moved from a first position towards a second position by backflow over said respective pressure surface; and
        a sensor circuit that responds to movement of said flap between said first and second positions and generates a corresponding electrical signal that indicates a stall condition; and
    wherein said sensor comprises a transducer that produces a varying output parameter as a function of relative movement of said flap such that said electrical signal provides a quantitative indication of magnitude of backflow over the low pressure surface.

11. The wind turbine as in claim 10, wherein said flap is biased towards said first position, said transducer comprising a load cell that measures resistance of said flap to the backflow.

12. A method for detecting stall of a wind turbine blade, comprising
- mounting an electronic stall sensor on a turbine blade surface at a location so as to be exposed to backflow in a stall condition of the blade, the stall sensor configured to produce an electrical signal upon being exposed to the backflow;
- transmitting the electrical signal from the stall sensor to a remote receiver;
- monitoring the remote receiver for indications of stall; and
- detecting and transmitting a quantitative value of the magnitude of stall with the stall sensor.

13. The method as in claim 12, comprising wirelessly transmitting the electrical signal to the remote receiver.

14. The method as in claim 12, wherein the stall sensor includes a flap member that moves from a first position towards a second position when exposed to backflow, the method comprising detecting a change in a circuit characteristic that varies with relative movement of the flap member.

15. The method as in claim 14, wherein the flap member is pivotally mounted to a base member, and further comprising attaching the base member to the turbine blade surface at a desired location to detect the stall condition.

16. The method as in claim 12, wherein the receiver is a component of a control system for the wind turbine, the method further comprising directly inputting the electrical signal from the stall sensor as an input variable for the control system.

17. The method as in claim 12, further comprising mounting the electronic stall sensor on a low pressure surface of the turbine blade.

18. The method as in claim 17, further comprising mounting an additional electronic stall sensor on a high pressure surface of the turbine blade so as to monitor for a stall condition at each of the low and high pressure surfaces of the turbine blade.

* * * * *